US012692379B2

(12) United States Patent
Neiwa et al.

(10) Patent No.: US 12,692,379 B2
(45) Date of Patent: Jul. 28, 2026

(54) FOAMABLE CHLORINATED VINYL CHLORIDE-BASED RESIN PARTICLES, FOAMED PARTICLES THEREOF, CHLORINATED VINYL CHLORIDE-BASED RESIN FOAM MOLDED ARTICLE, AND METHOD FOR PRODUCING FOAMABLE CHLORINATED VINYL CHLORIDE RESIN PARTICLES

(71) Applicant: KANEKA CORPORATION, Osaka (JP)

(72) Inventors: Yuki Neiwa, Osaka (JP); Ryuta Kutsumizu, Osaka (JP); Shotaro Maruhashi, Osaka (JP); Katsuyuki Tanaka, Hyogo (JP); Hisaki Shimokobe, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 980 days.

(21) Appl. No.: 17/950,417

(22) Filed: Sep. 22, 2022

(65) Prior Publication Data

US 2023/0024626 A1      Jan. 26, 2023

Related U.S. Application Data

(63) Continuation of application No. PCT/JP2020/036795, filed on Sep. 29, 2020.

(30) Foreign Application Priority Data

Mar. 24, 2020      (JP) ................................. 2020-052847

(51) Int. Cl.
| | |
|---|---|
| *C08J 9/16* | (2006.01) |
| *B29C 44/34* | (2006.01) |
| *C08J 9/14* | (2006.01) |
| *C08L 27/24* | (2006.01) |

(52) U.S. Cl.
CPC .......... *C08L 27/24* (2013.01); *B29C 44/3461* (2013.01); *C08J 9/141* (2013.01); *C08J 9/16* (2013.01); *C08J 2201/03* (2013.01); *C08J 2203/10* (2013.01); *C08J 2327/24* (2013.01); *C08J 2433/08* (2013.01); *C08L 2205/03* (2013.01)

(58) Field of Classification Search
CPC .. C08L 27/24; C08L 2205/03; B29C 44/3461; C08J 9/141; C08J 9/16; C08J 2201/03; C08J 2203/10; C08J 2327/24; C08J 2433/08
See application file for complete search history.

(56) References Cited

U.S. PATENT DOCUMENTS

| | | | |
|---|---|---|---|
| 3,366,580 | A | 1/1968 | Kraemer et al. |
| 4,360,602 | A | 11/1982 | Nehmey et al. |
| 4,766,156 | A | 8/1988 | Kimura et al. |
| 4,772,637 | A | 9/1988 | Kimura et al. |
| 4,785,023 | A | 11/1988 | Kimura et al. |
| 5,994,439 | A | 11/1999 | Masuda et al. |
| 6,590,041 | B1 | 7/2003 | Eguchi et al. |
| 2019/0276627 | A1 | 9/2019 | Takagi et al. |

FOREIGN PATENT DOCUMENTS

| | | | |
|---|---|---|---|
| CN | 101245159 A | | 8/2008 |
| CN | 109937232 A | | 6/2019 |
| JP | S57-036631 A | | 2/1982 |
| JP | S58-59234 A | | 4/1983 |
| JP | S63-233826 A | | 9/1988 |
| JP | S64-132 A | | 1/1989 |
| JP | H2-182735 A | | 7/1990 |
| JP | H7-314438 A | | 12/1995 |
| JP | H10-306187 A | | 11/1998 |
| JP | H11-269295 A | | 10/1999 |
| JP | 2000-273121 A | | 10/2000 |
| JP | 2002-284950 A | | 10/2002 |
| JP | 2010-179627 A | | 8/2010 |
| JP | 2017149891 A | * | 8/2017 |
| JP | 2018-127537 A | | 8/2018 |
| JP | 2018-131594 A | | 8/2018 |
| JP | 2020-164706 A | | 10/2020 |
| JP | 2020-164707 A | | 10/2020 |

OTHER PUBLICATIONS

Allsopp, M.W. and Vianello, G. (2002). Vinyl Chloride Polymers. In Encyclopedia of Polymer Science and Technology, (Ed.). https://doi.org/10.1002/0471440264.pst386 (Year: 2002).*
Bao, Y.Z. et al. Particle Features of Poly(vinyl chloride) Resins Prepared by a New Heterogeneous Polymerization Process. Journal of Applied Polymer Science, vol. 90, 954â958 (2003) (Year: 2003).*
Translation of JP 2017149891 by Takada et al. (Year: 2017).*
Translation of JP 2020164707 by Neiwa et al. (Year: 2020).*
Office Action issued in corresponding Chinese Patent Application No. 202080098752.X, dated Nov. 28, 2023 (11 pages).
International Search Report issued in corresponding International Application No. PCT/JP2020/036795 mailed Dec. 1, 2020 (6 pgaes).
Written opinion of International Search Authority issued in corresponding International Application No. PCT/JP2020/036795 mailed Dec. 1, 2020 (8 pages).
Extended European Search Report issued in corresponding Application No. 20927274.9 mailed Mar. 18, 2024 (7 pages).

* cited by examiner

*Primary Examiner* — Christina H.W. Rosebach
(74) *Attorney, Agent, or Firm* — Osha Bergman Watanabe & Burton LLP

(57) ABSTRACT

Expandable chlorinated vinyl chloride-based resin particles from which a chlorinated vinyl chloride-based resin foamed molded product achieving both high expansion ratio and excellent surface appearance are provided. The expandable chlorinated vinyl chloride-based resin particles have a porosity of not more than 5.5 (ml/100 g).

15 Claims, No Drawings

FOAMABLE CHLORINATED VINYL CHLORIDE-BASED RESIN PARTICLES, FOAMED PARTICLES THEREOF, CHLORINATED VINYL CHLORIDE-BASED RESIN FOAM MOLDED ARTICLE, AND METHOD FOR PRODUCING FOAMABLE CHLORINATED VINYL CHLORIDE RESIN PARTICLES

TECHNICAL FIELD

One or more embodiments of the present invention relate to: expandable chlorinated vinyl chloride-based resin particles; expanded particles thereof; a chlorinated vinyl chloride-based resin foamed molded product using the expandable chlorinated vinyl chloride-based resin particles and the expanded particles thereof; and a method for producing expandable chlorinated vinyl chloride-based resin particles.

BACKGROUND

Resin foamed products have lightness, heat insulating property, cushioning property, and other properties, and have conventionally been used widely as heat insulating materials for houses and heat retaining materials for pipes and the like. Among the resin foamed products, a styrene-based resin foamed molded product which is obtained with use of expandable styrene-based resin particles containing a blowing agent has a high degree of freedom in shape. Further, among foamed molded products obtained from expandable styrene-based resin particles, a styrene-based resin foamed product, which is obtained by, for example, an extrusion foaming method, having a simple shape such as a board shape has been utilized widely as a heat insulating material that can be applied to parts that are difficult to construct. A styrene-based resin is a flammable resin. Therefore, a flame retardant may be added to the styrene-based resin foamed molded product. As a result, flame retardancy of the styrene-based resin foamed molded product is secured. However, due to fire accidents at construction sites and fire cases at high-rise condominiums in recent years, heat insulating materials for buildings are increasingly required to have higher flame retardancy than before.

Examples of the foamed product having excellent flame retardancy include a resin foamed molded product using, as a base resin, a vinyl chloride-based resin having excellent flame retardancy or a chlorinated vinyl chloride-based resin having excellent flame retardancy.

For example, Patent Literature 1 describes a vinyl chloride resin foam sheet obtained by heating an expandable vinyl chloride-based resin paste which contains, in a specific ratio, a plasticizer, a pyrolyzable blowing agent, and vinyl chloride-based resin particles of different polymerization degrees and of different particle structures, to a temperature equal to or higher than a decomposition temperature of the pyrolyzable blowing agent.

Further, Patent Literatures 2 and 3 each describe foamed products obtained by subjecting, to in-mold foam molding, chlorinated vinyl chloride resin pre-expanded particles which are obtained with use of a blowing agent and a solvent compatible with a chlorinated vinyl chloride resin.

PATENT LITERATURE

[Patent Literature 1]
Japanese Patent Application Publication, Tokukai, No. 2018-131594

[Patent Literature 2]
Japanese Patent Application Publication, Tokukaisho, No. 64-132
[Patent Literature 3]
Japanese Patent Application Publication, Tokukaihei, No. 2-182735

Unfortunately, the conventional techniques as described above are insufficient and have some room for improvement, in terms of achieving both high expansion ratio and excellent surface appearance.

SUMMARY

One or more embodiments of the present invention provide expandable chlorinated vinyl chloride-based resin particles from which a chlorinated vinyl chloride-based resin foamed molded product achieving both high expansion ratio and excellent surface appearance can be obtained.

As a result of diligent studies, the inventors of the present disclosure found, through their own study, that a pore volume (porosity) of expandable chlorinated vinyl chloride-based resin particles contributes to expandability. On the basis of such novel finding, the inventors of the present disclosure succeeded in producing novel expandable chlorinated vinyl chloride-based resin particles from which a chlorinated vinyl chloride-based resin foamed molded product having excellent lightness (high expansion ratio) and excellent surface appearance can be obtained, and completed one or more embodiments of the present invention.

That is, expandable chlorinated vinyl chloride-based resin particles in accordance with one or more embodiments of the present invention have a porosity of not more than 5.5 (ml/100 g).

Further, a method for producing expandable chlorinated vinyl chloride-based resin particles in accordance with one or more embodiments of the present invention includes the step of: immediately after extruding a blowing agent-containing chlorinated vinyl chloride-based resin melt, which has been obtained by melting and kneading with use of an extruder, through a die having a plurality of holes into pressurized water, cutting the extruded blowing agent-containing chlorinated vinyl chloride-based resin melt into particles with use of a rotary cutter while cooling the extruded blowing agent-containing chlorinated vinyl chloride-based resin melt to solidify, wherein a resin temperature of the blowing agent-containing chlorinated vinyl chloride-based resin melt at a tip of the extruder is 130° C. to 250° C.

Further, a method for producing expandable chlorinated vinyl chloride-based resin particles in accordance with one or more embodiments of the present invention includes the step of: immediately after extruding a blowing agent-containing chlorinated vinyl chloride-based resin melt, which has been obtained by melting and kneading with use of an extruder, through a die having a plurality of holes into pressurized water, cutting the extruded melt into particles with use of a rotary cutter while cooling the extruded melt to solidify, wherein a pressure at a tip of the extruder is 4 MPa to 20 MPa.

Expandable chlorinated vinyl chloride-based resin particles in accordance with one or more embodiments of the present invention make it possible to provide a chlorinated vinyl chloride-based resin foamed molded product having high expansion ratio and excellent surface appearance.

DETAILED DESCRIPTION

The following description will discuss one or more embodiments of the present invention. The present invention is not, however, limited to these embodiments. The present invention is not limited to the configurations described below, but may be altered in various ways within the scope of the claims. The present invention also encompasses, in its technical scope, any embodiments or example derived by combining technical means disclosed in differing embodiments and Examples. Further, it is possible to form a new technical feature by combining the technical means disclosed in the respective embodiments. All academic and patent documents cited in the present specification are incorporated herein by reference. Any numerical range expressed as "A to B" in the present specification means "not less than A and not more than B" unless otherwise stated. Further, "A and/or B" means "A, B, or both A and B".

In the present disclosure, "expandable chlorinated vinyl chloride-based resin particles" may be referred to simply as "expandable resin particles", "chlorinated vinyl chloride-based resin expanded particles" may be referred to simply as "expanded particles", and "chlorinated vinyl chloride-based resin foamed molded product" may be referred to simply as "foamed molded product".

(Expandable Chlorinated Vinyl Chloride-Based Resin Particles)

The invention described in Patent Literature 1 obtains a sheet-shaped foamed product having a very low expansion ratio of 1 to 3 times. The foamed product obtained by the technique described in Patent Literature 1 has an extremely low expansion ratio and has a simple shape such as a sheet shape. Thus, the technique described in Patent Literature 1 has a problem from the viewpoint of the degree of freedom in shape. Meanwhile, the inventions described in Patent Literatures 2 and 3 are excellent in flame retardancy because a base resin is a chlorinated vinyl chloride resin that is superior in flame retardancy to vinyl chloride resin. Further, according to the techniques described in Patent Literatures 2 and 3, it is possible to obtain a foamed molded product having a degree of freedom in shape. However, in the techniques described in Patent Literatures 2 and 3, a blowing agent having a high global warming potential is used, and a large amount of organic solvent is used. Therefore, the techniques described in Patent Literatures 2 and 3 have environmental and cost problems.

Conventionally, there have been developed foamed molded products in which a vinyl chloride-based resin or a chlorinated vinyl chloride-based resin each having excellent flame retardancy is used as a base material. However, in consideration of environmental compatibility and cost, it is desirable to provide a foamed product having improved lightness and shape-imparting property while taking advantage of the flame retardancy of a vinyl chloride-based resin or the like.

Thus, as a result of diligent studies conducted by the inventors of one or more embodiments of the present invention, the inventors of one or more embodiments of the present invention newly found that expandable chlorinated vinyl chloride-based resin particles have pores, and the volume (porosity) of the pores can contribute to expandability. Then, the inventors of one or more embodiments of the present invention succeeded in achieving the effect in accordance with one or more embodiments of the present invention through the use of novel expandable chlorinated vinyl chloride-based resin particles developed based on such a new finding.

That is, expandable chlorinated vinyl chloride-based resin particles in accordance with one or more embodiments of the present invention have a porosity of not more than 5.5 (ml/100 g). Note that a value of the porosity in the present specification includes a range obtained by rounding to one decimal place. According to the expandable chlorinated vinyl chloride-based resin particles in accordance with one or more embodiments of the present invention, it is possible to obtain chlorinated vinyl chloride-based resin foamed molded product having high expansion ratio and excellent surface appearance. The expandable chlorinated vinyl chloride-based resin particles in accordance with one or more embodiments of the present invention may have a porosity of not more than 5.4 (ml/100 g), not more than 5.3 (ml/100 g), not more than 5.2 (ml/100 g), or not more than 5.1 (ml/100 g). In a case where the porosity of the expandable resin particles is within any of the above-described ranges, the blowing agent is not easily dissipated from the expandable resin particles when the expandable resin particles are expanded. As a result, it is possible to obtain a foamed molded product having high expansion ratio. Further, in a case where the blowing agent remains in the expanded particles when the expanded particles are subjected to molding, the second-step expandability of the expanded particles increases. As a result, it is possible to obtain a foamed molded product having excellent surface appearance. The conventional method for producing expandable vinyl chloride-based resin particles is a method in which a large amount of solvent is used, and impregnation with a blowing agent is carried out. Therefore, in the conventional method for producing expandable vinyl chloride-based resin particles, it is inferred that pores are easily formed in obtained expandable vinyl chloride-based resin particles since an additive and the like are eluted into the blowing agent during impregnation with the blowing agent. Note that a lower limit of the porosity of the expandable chlorinated vinyl chloride-based resin particles in accordance with one or more embodiments of the present invention is not particularly limited, but is, for example, not less than 0.5 (ml/100 g). In the present specification, the porosity is a pore volume measured by a mercury injection method. Specifically, the porosity can be determined by a measurement method described later.

The expandable chlorinated vinyl chloride-based resin particles in accordance with one or more embodiments of the present invention are such that a maximum expansion ratio (times)/volatile component content at the expansion (% by weight) may be not less than 2.2, not less than 2.3, not less than 2.4, not less than 2.5, not less than 2.6, not less than 2.7, not less than 2.8, or not less than 2.9. A maximum expansion ratio (times)/volatile component content at the expansion (% by weight) falling within any of the above-described ranges enables achievement of high expansion ratio with use of a small amount of blowing agent and brings excellent expansion efficiency. In the present specification, the maximum expansion ratio is the highest ratio obtained when evaluation of expansion in a heated air atmosphere has been carried out. A method by which to carry out the evaluation of expansion in a heated air atmosphere will be described later. In the present specification, the volatile component content at the expansion is a rate of change in weight obtained when the expandable chlorinated vinyl chloride-based resin particles used at the evaluation of expansion in a heated air atmosphere have been heated at 150° C. for 30 minutes. Specifically, the volatile component content at the expansion can be determined by a measurement method described later. Note that, since the volatile component content in the expandable chlorinated vinyl chloride-based resin particles changes over time, it is preferable that a shorter time interval be placed between the measurement of the volatile component content at the expansion and the expansion evaluation or between the expansion evaluation and the measurement of the volatile component content at the expansion.

(Chlorinated Vinyl Chloride-Based Resin)

In one or more embodiments of the present invention, the use of chlorinated vinyl chloride-based resin makes it possible to obtain expandable chlorinated vinyl chloride-based resin particles from which a foamed molded product achieving both excellent flame retardancy and high expansion ratio can be obtained.

The chlorinated vinyl chloride-based resin used in one or more embodiments of the present invention is usually produced, with use of a vinyl chloride-based resin as a raw material, by a method such as the following methods (a) and (b):

(a) A method in which the vinyl chloride-based resin is chlorinated in an aqueous medium by, for example, in a state in which the vinyl chloride-based resin is dispersed in the aqueous medium, supplying chlorine into the aqueous medium, and then (i) subjecting an obtained mixture to photochlorination by irradiating the obtained mixture with a mercury lamp or (ii) subjecting the obtained mixture to thermochlorination; and (b) A method in which the vinyl chloride-based resin is chlorinated in an air layer by, for example, chlorinating the vinyl chloride-based resin in the air layer under irradiation of a mercury lamp.

As the chlorinated vinyl chloride-based resin, resins obtained by chlorinating various vinyl chloride-based resins are used. Examples of a vinyl chloride-based resin to be chlorinated include (a) a homopolymer of vinyl chloride, (b) a copolymer of (i) vinyl chloride and (ii) another monomer which is copolymerizable with vinyl chloride. Examples of the another monomer which is copolymerizable with vinyl chloride include ethylene, propylene, vinyl acetate, allyl chloride, allyl glycidyl ether, acrylic acid ester, and vinyl ether.

An average polymerization degree of the vinyl chloride-based resin before chlorination, which is the raw material, is not particularly limited. A lower limit of the average polymerization degree may be not less than 300, or not less than 400. An upper limit of the average polymerization degree may be not more than 3000, or not more than 1500. In a case where the average polymerization degree falls within the above-described range, expanded particles having high expansion ratio are more likely to be obtained. Note that the average polymerization degree of the chlorinated vinyl chloride-based resin is considered to be substantially the same as the average polymerization degree of the vinyl chloride-based resin before chlorination. The average polymerization degree of the vinyl chloride-based resin before chlorination is measured in conformity to JIS K 6720-2.

A weight average molecular weight of the chlorinated vinyl chloride-based resin is not particularly limited, but may be in a range of not less than 30,000 and not more than 400,000. In a case where the weight average molecular weight falls within the above-described range, expanded particles having high expansion ratio are more likely to be obtained. The weight average molecular weight is evaluated by gel permeation chromatography in terms of polystyrene-equivalent molecular weight.

A chlorine content of the chlorinated vinyl chloride-based resin may be in a range of not less than 60% by weight and not more than 75% by weight, from the viewpoint of ensuring expandability. The chlorine content may be not less than 64% by weight and not more than 70% by weight. The higher the chlorine content, the more likely expanded particles having high expansion ratio are to be obtained. An excessively high chlorine content makes it more likely to significantly impair the processability at the time of extrusion due to an increase in melt viscosity. The chlorine content of the chlorinated vinyl chloride-based resin and the chlorine content of the vinyl chloride-based resin are measured in conformity to JIS K 7385 B method.

In one or more embodiments of the present invention, only one type of chlorinated vinyl chloride-based resin may be used, or two or more types of chlorinated vinyl chloride-based resins may be used in combination.

(Blowing Agent)

As the blowing agent contained in the expandable chlorinated vinyl chloride-based resin particles in accordance with one or more embodiments of the present invention, a known blowing agent can be used, and the blowing agent is not particularly limited, and examples thereof include the following blowing agents. As the blowing agent, for example, (a) physical blowing agents including: (i) hydrocarbons such as normal butane, isobutane, normal pentane, isopentane, neopentane, cyclopentane, normal hexane, and cyclohexane; (ii) ethers such as dimethyl ether, diethyl ether, methyl ethyl ether, isopropyl ether, n-butyl ether, diisopropyl ether, furan, furfural, 2-methylfuran, tetrahydrofuran, and tetrahydropyran; (iii) ketones such as dimethyl ketone (acetone), methyl ethyl ketone, diethyl ketone, methyl-n-propyl ketone, methyl-n-butyl ketone, methyl-1-butyl ketone, methyl-n-hexyl ketone, ethyl-n-propyl ketone, and ethyl-n-butyl ketone; (iv) saturated alcohols each having 1 to 4 carbon atom(s), such as methanol, ethanol, propyl alcohol, i-propyl alcohol, butyl alcohol, i-butyl alcohol, and t-butyl alcohol; (v) carboxylic acid esters such as methyl formate, ethyl formate, propyl formate, butyl formate, amyl formate, methyl propionate, and ethyl propionate; (vi) alkyl halides such as methyl chloride and ethyl chloride; (vii) hydrofluoroolefins, such as trans-1,3,3,3-tetrafluoropropene (trans-HFO-1234e), cis-1,3,3,3-tetrafluoropropene (cis-HFO-1234ze), 2,3,3,3-tetrafluoropropene (trans-HFO-1234yf), trans-1-chloro-3,3,3-trifluoropropene (trans-HCFO-1233zd), and cis-1-chloro-3,3,3-trifluoropropene (cis-HCFO-1233zd), and chlorinated hydrofluoroolefins; and (viii) inorganic blowing agents such as water, carbon dioxide, and nitrogen and (b) chemical blowing agents such as an azo compound and tetrazole can be used. One of these blowing agents can be used solely. Alternatively, two or more of these blowing agents can be used in combination.

The expandable chlorinated vinyl chloride-based resin particles in accordance with one or more embodiments of the present invention may contain a physical blowing agent as the blowing agent, or at least one saturated hydrocarbon having 4 to 6 carbon atoms (4 carbon atoms, 5 carbon atoms, and 6 carbon atoms) among physical blowing agents. The saturated hydrocarbon having 4 to 6 carbon atoms is exemplified by, for example, normal butane, isobutane, normal pentane, isopentane, neopentane, cyclopentane, normal hexane, and cyclohexane. The expandable chlorinated vinyl chloride-based resin particles in accordance with one or more embodiments of the present invention may contain at least pentane, as the saturated hydrocarbon having 4 to 6 carbon atoms, from the viewpoint of solubility of the blowing agent in a resin and retainability in expandable chlorinated vinyl chloride-based resin expanded particles and in chlorinated vinyl chloride-based resin expanded particles.

The expandable chlorinated vinyl chloride-based resin particles in accordance with one or more embodiments of the present invention may contain ketone as the blowing agent, from the viewpoint of improvement in the solubility of the blowing agent in a resin. For example, a combined use of at least one saturated hydrocarbon having 4 to 6 carbon atoms and ketone as the blowing agent enables further improvement in the solubility of the saturated hydrocarbon having 4 to 6 carbon atoms in a resin.

In one or more embodiments of the present invention, the blowing agent is contained in an amount of 1% by weight to 40% by weight, with respect to 100% by weight of the expandable chlorinated vinyl chloride-based resin particles. Controlling the contained amount of the blowing agent to be within the above-described predetermined range brings about the effect of easily obtaining expanded particles having high expansion ratio and foamed molded product having excellent surface appearance. A more preferable range of the contained amount of the blowing agent is 3% by weight to 25% by weight, and more preferable range thereof is 5% by weight to 20% by weight.

(Processing Aid)

In one or more embodiments of the present invention, the expandable chlorinated vinyl chloride-based resin particles may contain a processing aid. The processing aid may be any processing aid generally used for chlorinated vinyl chloride-based resins. Examples of the processing aid include (a) a copolymer having a structural unit derived from an aromatic vinyl monomer and a structural unit derived from an unsaturated nitrile monomer, such as a styrene-acrylonitrile copolymer, (that is, a copolymer having an aromatic vinyl monomer and an unsaturated nitrile as structural units), (b) an acrylic-based resin, (c) an impact resistance improver such as a methyl methacrylate-butadiene-styrene-based polymer, and (d) chlorinated polyethylene. From the viewpoint of easily obtaining expanded particles having high expansion ratio and a foamed molded product having high expansion ratio, the expandable chlorinated vinyl chloride-based resin particles may contain, as the processing aid, at least one selected from the group consisting of a copolymer having a structural unit derived from an aromatic vinyl monomer and a structural unit derived from an unsaturated nitrile monomer, an acrylic-based resin, and chlorinated polyethylene. From the viewpoint of improving the fluidity of the chlorinated vinyl chloride-based resin and improving the molding processability, the expandable chlorinated vinyl chloride-based resin particles may contain, as the processing aid, a copolymer having a structural unit derived from an aromatic vinyl monomer and a structural unit derived from an unsaturated nitrile monomer and/or an acrylic-based resin, and chlorinated polyethylene.

In one or more embodiments of the present invention, the use of the copolymer having a structural unit derived from an aromatic vinyl monomer and a structural unit derived from an unsaturated nitrile monomer together with the chlorinated vinyl chloride-based resin brings about the following excellent effect. That is, in pre-expansion and foam molding under a steam heating condition, it is easy to obtain expanded particles having high expansion ratio and a foamed molded product having high expansion ratio.

In the copolymer having a structural unit derived from an aromatic vinyl monomer and a structural unit derived from an unsaturated nitrile monomer, examples of the aromatic vinyl monomer include styrene, α-methylstyrene, ethylstyrene, and a styrene derivative such as halogenated styrene. Examples of the unsaturated nitrile monomer include acrylonitrile and methacrylonitrile.

The copolymer having a structural unit derived from an aromatic vinyl monomer and a structural unit derived from an unsaturated nitrile monomer may have a structural unit derived from other monomer which is not the aromatic vinyl monomer or the unsaturated nitrile monomer (that is, it can also be referred to as a structural unit derived from other monomer which is copolymerizable with an aromatic vinyl monomer and/or an unsaturated nitrile monomer), provided that the effects of one or more embodiments of the present invention are not impaired. Examples of the other monomer which is copolymerizable with an aromatic vinyl monomer and/or an unsaturated nitrile monomer include (meth)acrylic acid ester such as methyl (meth)acrylate, ethyl (meth)acrylate, N-butyl (meth)acrylate, isobutyl (meth)acrylate, and 2-ethylhexyl (meth)acrylate, (meth)acrylic acid, maleic anhydride, and N-substituted-maleimide.

With regard to a preferable range of the structural unit derived from an unsaturated nitrile monomer in the copolymer having a structural unit derived from an aromatic vinyl monomer and a structural unit derived from an unsaturated nitrile monomer, the structural unit derived from an unsaturated nitrile monomer may be 5% by weight to 45% by weight, 8% by weight to 35% by weight, or 10% by weight to 30% by weight, on the assumption that the whole of the copolymer having a structural unit derived from an aromatic vinyl monomer and a structural unit derived from an unsaturated nitrile monomer is 100% by weight. In a case where the structural unit derived from an unsaturated nitrile monomer is in the above-described range, it is easy to obtain expanded particles having high expansion ratio and a foamed molded product having high expansion ratio.

A preferable aspect of the copolymer having a structural unit derived from an aromatic vinyl monomer and a structural unit derived from an unsaturated nitrile monomer includes a styrene-acrylonitrile copolymer. One type of the copolymer having a structural unit derived from an aromatic vinyl monomer and a structural unit derived from an unsaturated nitrile monomer may be used alone, or two or more types of the copolymer having a structural unit derived from an aromatic vinyl monomer and a structural unit derived from an unsaturated nitrile monomer may be used in combination. In a preferable embodiment, a styrene-acrylonitrile copolymer is used as at least one type of the copolymer having a structural unit derived from an aromatic vinyl monomer and a structural unit derived from an unsaturated nitrile monomer. The copolymer having a structural unit derived from an aromatic vinyl monomer and a structural unit derived from an unsaturated nitrile monomer may be such that the weight-average molecular weight of the copolymer is higher than the weight-average molecular weight of the chlorinated vinyl chloride-based resin used, from the viewpoint of easily ensuring high expansion ratio of obtained expanded particles. Note the weight-average molecular weight of the copolymer having a structural unit derived from an aromatic vinyl monomer and a structural unit derived from an unsaturated nitrile monomer is evaluated by gel permeation chromatography in terms of polystyrene-equivalent molecular weight. As the copolymer having a structural unit derived from an aromatic vinyl monomer and a structural unit derived from an unsaturated nitrile monomer, for example, Blendex 869 available from Galata can be used.

In the expandable chlorinated vinyl chloride-based resin particles in accordance with one or more embodiments of the present invention, the content of the copolymer having a structural unit derived from an aromatic vinyl monomer and a structural unit derived from an unsaturated nitrile monomer is not particularly limited, provided that the effects of one or more embodiments of the present invention are not impaired, but is preferably 1 part by weight to 50 parts by weight, more preferably 3 parts by weight to 40 parts by weight, even more preferably 5 parts by weight to 35 parts by weight, and particularly preferably 8 parts by weight to 30 parts by weight, with respect to 100 parts by weight of the chlorinated vinyl chloride-based resin. (a) In a case where the content of the copolymer is not less than 1 part by weight with respect to 100 parts by weight of the chlorinated vinyl chloride-based resin, it is easy to obtain expanded particles having high expansion ratio and/or foamed molded product having high expansion ratio, and (b) in a case where the content of the copolymer is not more than 50 parts by weight with respect to 100 parts by weight of the chlorinated vinyl chloride-based resin, it is possible to obtain expanded particles having excellent flame retardancy and/or foamed molded product having excellent flame retardancy.

Specific examples of the acrylic-based resin include, for example, (a) poly(methyl methacrylate) obtained by polymerizing methyl methacrylate and poly(methyl acrylate) obtained by polymerizing methyl acrylate and (b) a copolymer of (i) methyl methacrylate or methyl acrylate and (ii) at least one of monomers which is copolymerizable with methyl methacrylate or methyl acrylate, the monomers including, for example, an alkyl methacrylic acid ester having an alkyl group of 2 to 8 carbon atoms such as n-butyl methacrylate, an alkyl acrylic acid ester having an alkyl group of 2 to 8 carbon atoms such as ethyl acrylate, butylene, substituted styrene, and acrylonitrile. With regard to the acrylic-based resin, an acrylic-based resin such that the weight-average molecular weight of the acrylic-based resin is higher than the weight-average molecular weight of the chlorinated vinyl chloride-based resin used may be used, from the viewpoint of easily ensuring high expansion ratio of obtained expanded particles. Note that the weight-average molecular weight of the acrylic-based resin is evaluated by gel permeation chromatography in terms of polystyrene-equivalent molecular weight. As the acrylic-based resin, for example, KANE ACE PA-40 available from Kaneka Corporation can be used.

In the expandable chlorinated vinyl chloride-based resin particles in accordance with one or more embodiments of the present invention, the content of the acrylic-based resin is not particularly limited, provided that the effects of one or more embodiments of the present invention are not impaired, but is preferably 1 part by weight to 50 parts by weight, more preferably 5 parts by weight to 50 parts by weight, and even more preferably 8 parts by weight to 30 parts by weight, with respect to 100 parts by weight of the chlorinated vinyl chloride-based resin. (a) In a case where the content of the copolymer is not less than 1 part by weight with respect to 100 parts by weight of the chlorinated vinyl chloride-based resin, it is easy to obtain expanded particles having high expansion ratio and/or foamed molded product having high expansion ratio, and (b) in a case where the content of the copolymer is not more than 50 part by weight with respect to 100 parts by weight of the chlorinated vinyl chloride-based resin, it is possible to obtain expanded particles having excellent flame retardancy and/or foamed molded product having excellent flame retardancy.

In the expandable chlorinated vinyl chloride-based resin particles in accordance with one or more embodiments of the present invention, the content of the chlorinated polyethylene is not particularly limited, provided that the effects of one or more embodiments of the present invention are not impaired, but is preferably 1 part by weight to 30 parts by weight, more preferably 2 parts by weight to 25 parts by weight, and even more preferably 3 parts by weight to 20 parts by weight, with respect to 100 parts by weight of the chlorinated vinyl chloride-based resin. Note that the chlorine content of the chlorinated polyethylene is measured in conformity to JIS K7385 B method.

(Other Additives)

Expandable chlorinated vinyl chloride-based resin particles in accordance with one or more embodiments of the present invention may contain, for example, a flame retardant, a stabilizer, a lubricant, a nucleating agent, an expansion/foaming aid, an antistatic agent, a radiative heat transfer inhibitor, a plasticizer, a solvent, and a colorant such as a pigment and a dye, as necessary, provided that the effects of one or more embodiments of the present invention are not impaired.

As the flame retardant, a known flame retardant can be used. Examples of the flame retardant include (a) a bromine-based flame retardant, (b) a phosphorus-based flame retardant, (c) a boron-based flame retardant, (d) an intumescent-based flame retardant such as melamine polyphosphate and ammonium polyphosphate, (e) a melamine-based flame retardant such as melamine cyanurate, (f) a hydroxide compound such as aluminum hydroxide and magnesium hydroxide, and (g) an auxiliary flame retardant such as antimony oxide, zinc oxide, and zinc borate.

As the stabilizer, a stabilizer conventionally used for chlorinated vinyl chloride-based resins can be used. Examples of the stabilizer include (a) a tin-based stabilizer, (b) an antioxidant such as a phenol-based compound, a phosphorus-based compound, and an amine-based compound, (c) an epoxy-based stabilizer, and (d) zeolite. The amount of each stabilizer used in the expandable chlorinated vinyl chloride-based resin particles in accordance with one or more embodiments of the present invention is not particularly limited, provided that the effects of one or more embodiments of the present invention are not impaired, but is preferably not more than 10 parts by weight with respect to 100 parts by weight of the chlorinated vinyl chloride-based resin.

Examples of the lubricant include (a) a wax such as ester wax and polyethylene wax and (b) a fatty acid metal salt such as calcium stearate and zinc stearate.

Examples of the nucleating agent include inorganic compounds such as silica, silicate calcium, wollastonite, kaolin, clay, mica, zinc oxide, calcium carbonate, sodium hydrogen carbonate, zeolite, and talc.

Examples of the radiative heat transfer inhibitor include substances having the property of reflecting, scattering, or absorbing light in a near-infrared or infrared region, including, for example, graphite, graphene, carbon black, expanded graphite, titanium oxide, and aluminum.

Other resin (a thermoplastic resin and a thermosetting resin) may be used in combination with the chlorinated vinyl chloride-based resin, provided that the effects of one or more embodiments of the present invention are not impaired. As the other resin, a vinyl chloride-based resin is preferable from the viewpoint of flame retardancy. Examples of the vinyl chloride-based resin includes (a) a homopolymer of vinyl chloride and (b) a copolymer of (i) a vinyl chloride monomer and (ii) other monomer which is copolymerizable with vinyl chloride. Examples of the other monomer which is copolymerizable with vinyl chloride include ethylene, propylene, vinyl acetate, allyl chloride, allyl glycidyl ether, acrylic acid ester, and vinyl ether. The average polymerization degree of the vinyl chloride-based resin is not particularly limited, but is preferably not less than 300 and not more than 7000.

In a case where the chlorinated vinyl chloride-based resin is used in combination with other resin, the blending amount of the other resin is not particularly limited, provided that the effects of one or more embodiments of the present invention are not impaired, but is preferably 0 part by weight to 99 parts by weight with respect to 100 parts by weight of the chlorinated vinyl chloride-based resin.

The expandable chlorinated vinyl chloride-based resin particles in accordance with one or more embodiments of the present invention may have any shape, provided that they are particles having a shape which allows expandable resin particles as described later to be pre-expanded and foam-molded. The expandable chlorinated vinyl chloride-based resin particles in accordance with one or more embodiments of the present invention include not only general particulates (for example, small rounded particles such as spherical particles, substantially spherical particles, convex lens-shaped particles, concave lens-shaped particles, and spindle-shaped particles), but also particles with depressions. Note that the expandable chlorinated vinyl chloride-based resin particles in accordance with one or more embodiments of the present invention may have a particle weight of 0.5 mg to 10 mg per particle, 1 mg to 8 mg per particle, or 3 mg to 7 mg per particle, from the viewpoint of ensuring mold-filling property of expanded particles and, in turn, ensuring moldability such as surface appearance of a foamed molded product.

The expandable chlorinated vinyl chloride-based resin particles in accordance with one or more embodiments of the present invention may have a true density of not less than 1100 $kg/m^3$, not less than 1150 $kg/m^3$, not less than 1200 $kg/m^3$, or not less than 1250 $kg/m^3$, from the viewpoint of decreasing a speed at which the blowing agent is dissipated from the expandable chlorinated vinyl chloride-based resin particles or further increasing the expansion ratio of expanded particles to be obtained. The true density referred to herein can be obtained by a measurement method described later.

(Method for Producing Expandable Chlorinated Vinyl Chloride-Based Resin Particles)

As one or more embodiments of a method for producing expandable chlorinated vinyl chloride-based resin particles in accordance with one or more embodiments of the present invention (hereinafter may be referred to as "production method"), a production method in which the following (1) to (4) are carried out is taken:

(1) Supplying a chlorinated vinyl chloride-based resin and, if necessary, various additives into an extruder and melting and kneading the supplied raw materials;

(2) Dissolving and dispersing a blowing agent in a melted and kneaded product by the extruder or a dispersion facility which is provided downstream from the extruder;

(3) Extruding the melted and kneaded product (resin melt) of a blowing agent-containing chlorinated vinyl chloride-based resin composition through a die attached downstream from the extruder and having many small holes into a cutter chamber filled with pressurized circulating water; and (4) immediately after the extrusion of the melted and kneaded product (resin melt), cutting the melted and kneaded product (resin melt) with use of a rotary cutter which is in contact with the die, while cooling the melted and kneaded product by the pressurized circulating water to solidify, so that expandable chlorinated vinyl chloride-based resin particles are obtained.

According to the above-described production method, it is possible to easily obtain expandable chlorinated vinyl chloride-based resin particles having a predetermined porosity in accordance with one or more embodiments of the present invention. As a result, a chlorinated vinyl chloride-based resin foamed molded product having high expansion ratio and excellent surface appearance is obtained by using the expandable chlorinated vinyl chloride-based resin particles. Further, according to the above-described production method, melting and kneading the blowing agent and the chlorinated vinyl chloride-based resin makes it possible to decrease the viscosity of the resin melt, and it is possible to decrease a molding processing temperature of the chlorinated vinyl chloride-based resin. As a result, the chlorinated vinyl chloride-based resin, and the vinyl chloride-based resin and the additive(s), both of which are used in combination with the chlorinated vinyl chloride-based resin as necessary, are less likely to be thermally decomposed.

In the above-described production method, a general extruder can be used as the extruder, and specific examples of the extruder include a single-screw extruder, a twin-screw extruder, and a tandem extruder. Examples of the tandem extruder include an extruder in which two single-screw extruders are connected, and an extruder in which a single-screw extruder is connected to a twin-screw extruder. Further, the extruder may be used in combination with a dispersion facility such as a static mixer and/or a stirrer having no screw.

Note that, in the above-described production method, it is preferable that the chlorinated vinyl chloride-based resin and the vinyl chloride-based resin, which is used in combination with the chlorinated vinyl chloride-based resin as necessary, be sufficiently gelled. If the chlorinated vinyl chloride-based resin and the like are not sufficiently gelled, the speed at which the blowing agent is dissipated from the expandable resin particles may increase when the chlorinated vinyl chloride-based resin is processed into expandable resin particles. Thus, the blowing agent tends to be difficult to contribute to expansion. This may, in turn, makes it difficult to obtain expanded particles having high expansion ratio or a high closed cell ratio and a foamed molded product having high expansion ratio or a high closed cell ratio.

A resin temperature during resin melting and kneading may affect thermal decomposition of the chlorinated vinyl chloride-based resin, and the vinyl chloride-based resin and the additive(s), both of which are used in combination with the chlorinated vinyl chloride-based resin as necessary. Thus, the resin temperature of the resin melt at a tip of the extruder may be 130° C. to 250° C., 140° C. to 240° C., or 150° C. to 220° C. The resin temperature of the resin melt at the tip of the extruder is a value measured by a temperature sensor attached to the tip of the extruder. In a case where two or more extruders are mounted on the upstream side of the die, the temperature of the tip of the extruder which is mounted on the most downstream side is considered to be the resin temperature of the resin melt at the tip of the extruder in the present specification. Further, in the present specification, the "tip of the extruder" is intended to be the tip of the extruder on the downstream side along the extrusion direction. Therefore, in a case where two or more extruders are mounted on the upstream side of the die, the temperature of the tip, of the extruder mounted on the most downstream side, on the downstream side along the extrusion direction is considered to be the resin temperature of the resin melt at the tip of the extruder in the present specification. When the resin temperature of the resin melt at the tip of the extruder is not lower than 130° C., the resin melt has a decreased resin viscosity, so that melting and kneading can be sufficiently carried out in the extruder. If the resin temperature of the resin melt exceeds 250° C., the chlorinated vinyl chloride-based resin, and the vinyl chloride-based resin and the additive(s), both of which are used in combination with the chlorinated vinyl chloride-based resin as necessary, may be thermally decomposed. This may, in turn, induce deterioration of the expandable chlorinated vinyl chloride-based resin particles, which leads to a decrease in expandability.

(Conditions of Granulation Step)

The following will describe conditions of a granulation step in the method for producing expandable chlorinated vinyl chloride-based resin particles.

In one or more embodiments in which the melted and kneaded product (resin melt) is extruded from the die, the die is not particularly limited, but can be, for example, one which has small holes each having a diameter of preferably 0.3 mm to 2.0 mm, and more preferably 0.4 mm to 1.5 mm.

In the method for producing expandable chlorinated vinyl chloride-based resin particles, a pressure at the tip of the extruder mounted on the upstream side of the die may be 4 MPa to 20 MPa, 6 MPa to 18 MPa, or 7 MPa to 15 MPa. Note that the pressure at the tip of the extruder is a value measured by a pressure sensor attached to the tip of the extruder. In a case where two or more extruders are mounted on the upstream side of the die, the pressure at the tip of the extruder which is mounted on the most downstream side is considered to be the pressure at the tip of the extruder in the present specification. More specifically, in a case where two or more extruders are mounted on the upstream side of the die, the pressure at the tip, of the extruder mounted on the most downstream side, on the downstream side along the extrusion direction is considered to be the pressure at the tip of the extruder in the present specification. When the pressure at the tip of the extruder is not less than 4 MPa, it becomes easy to dissolve and disperse the blowing agent in the resin(s) during melting and kneading, and it is possible to stably obtain expandable chlorinated vinyl chloride-based resin particles. Meanwhile, when the pressure at the tip of the extruder is not more than 20 MPa, it is possible to suppress shear heat generation during melting and kneading, and the chlorinated vinyl chloride-based resin, and the vinyl chloride-based resin and the additive(s), both of which are used in combination with the chlorinated vinyl chloride-based resin as necessary, are less likely to be thermally decomposed.

In the method for producing expandable chlorinated vinyl chloride-based resin particles, the temperature of the molten resin (resin melt) immediately before being extruded through the die may be not lower than Tg+20° C., Tg+20° C. to Tg+130° C., Tg+30° C. to Tg+110° C., or Tg+40° C. to Tg+90° C. where Tg is a glass transition temperature of the resin in a state where the resin contains no blowing agent. Note that, with regard to the chlorinated vinyl chloride-based resin, the glass transition temperature increases with an increase in the chlorine content. Thus, it is preferable that the temperature of the molten resin (resin melt) immediately before being extruded through the die be adjusted as appropriate according to the chlorine content of the chlorinated vinyl chloride-based resin to be used. In a case where the temperature of the molten resin (resin melt) immediately before being extruded from the die is not lower than Tg+20° C., the molten resin (resin melt) extruded has low viscosity, so that the small holes of the die are clogged less frequently, and a decrease in actual open hole rate of the small holes of the die does not occur. Thus, it is possible to avoid a situation in which the shape of obtained expandable chlorinated vinyl chloride-based resin particles becomes distorted or inconsistent. Meanwhile, in a case where the temperature of the molten resin (resin melt) immediately before being extruded from the die is not higher than Tg+130° C., the molten resin (resin melt) extruded more easily solidifies, the molten resin (resin melt) is not easily tangled around the rotary cutter, and the molten resin (resin melt) can be cut more stably.

The "resin in a state where the resin contains no blowing agent" is intended to be a resin containing a chlorinated vinyl chloride-based resin and, if necessary, a vinyl chloride-based resin, a processing aid, and an additive (except for a blowing agent), which are used in combination with the chlorinated vinyl chloride-based resin. It can be said that the "resin in a state where the resin contains no blowing agent" is a base resin described later.

In the method for producing expandable chlorinated vinyl chloride-based resin particles, a cutting device which cuts the molten resin (resin melt) extruded into the circulating pressurized cooling water is not particularly limited. The cutting device can be, for example, a device by which: (i) the molten resin (resin melt) is cut by a rotary cutter, which is in contact with the die, into particles, (ii) obtained expandable resin particles are transferred, without being expanded, in the pressurized circulating cooling water to the centrifugal dehydrator, and (iii) the expandable resin particles are dewatered and collected.

The condition of the pressurized circulating cooling water should be adjusted according to the type of resin, additive, blowing agent, etc. used, and/or the content of each component. The condition for the pressurized circulating cooling water, may be a condition under which the expansion of the molten resin (resin melt) extruded from the die is suppressed and the molten resin (resin melt) is stably cut with use of a cutter. Specifically, a temperature condition of the pressurized circulating cooling water may be 40° C. to 99° C., or 60° C. to 90° C.

As a pressure condition of the pressurized circulating cooling water, it is preferable that the pressure be adjusted so that the expansion ratio of obtained expandable chlorinated vinyl chloride-based resin particles becomes 1.0 times to 1.25 times. Note that the expansion ratio of the expandable chlorinated vinyl chloride-based resin particles refers to a value obtained by dividing a true density (kg/m$^3$) of the base resin by a true density (kg/m$^3$) of the expandable chlorinated vinyl chloride-based resin particles. The true density of the base resin and the true density of the expandable chlorinated vinyl chloride-based resin particles referred to herein are calculated after chlorinated vinyl chloride-based resin pellets or expandable chlorinated vinyl chloride-based resin particles having a weight W (kg) are submerged in ethanol in a graduated cylinder, and a volume V (m$^3$) is determined from a difference in liquid level in the graduated cylinder (submersion method). Specifically, these true densities can be obtained by a measurement method described later.

Although depending on the type of blowing agent used, the pressure condition of the pressurized circulating cooling water may be 0.6 MPa to 2.0 MPa, 0.7 MPa to 1.8 MPa, or 0.8 MPa to 1.6 MPa.

(Chlorinated Vinyl Chloride-Based Resin Expanded Particles and Method for Producing the Same)

The expandable chlorinated vinyl chloride-based resin particles in accordance with one or more embodiments of the present invention are pre-expanded 2 times to 110 times by a heating medium such as heated air and/or steam to become chlorinated vinyl chloride-based resin expanded particles. After that, the chlorinated vinyl chloride-based resin expanded particles can be used for a foamed molded product. The steam that can be used may be saturated steam or may be superheated steam.

The heating temperature at the expansion should be adjusted as appropriate according to, for example, the glass transition temperature or melting point of the resin and the content of the blowing agent, but may be not lower than 90° C., or not lower than 100° C. Meanwhile, from the viewpoint of suppressing variation in expansion ratio between expanded particles or preventing shrinkage of the expanded particles, the heating temperature at the expansion may be not higher than 150° C., or not higher than 130° C.

(Chlorinated Vinyl Chloride-Based Resin Foamed Molded Product and Method for Producing the Same)

The obtained chlorinated vinyl chloride-based resin expanded particles are molded (e.g., in-mold molding) by, for example, steam with use of a conventionally known molding machine to prepare a chlorinated vinyl chloride-based resin foamed molded product. Depending on the shape of a mold used, it is possible to obtain an in-mold molded product having a complex shape and a molded product having a shape of a block.

(Average Cell Diameter)

The chlorinated vinyl chloride-based resin expanded particles in accordance with one or more embodiments of the present invention and the chlorinated vinyl chloride-based resin foamed molded product in accordance with one or more embodiments of the present invention obtained from the chlorinated vinyl chloride-based resin expanded particles may have an average cell diameter of 70 μm to 1000 μm, 90 μm to 800 μm, or 100 μm to 600 μm. In a case where the expanded particles and the foamed molded product each have the average cell diameter in the range as described above, the chlorinated vinyl chloride-based resin foamed molded product has higher heat insulating property. In a case where the average cell diameter is not less than 70 μm, the expansion ratio tends to be easily increased. Further, in a case where the average cell diameter is not more than 1000 μm, it is possible to avoid deterioration of the heat insulating performance. The average cell diameter of the expanded particles and the average cell diameter of the foamed molded product in the present specification are determined by a measurement method described later.

(Closed Cell Ratio)

The chlorinated vinyl chloride-based resin expanded particles in accordance with one or more embodiments of the present invention and the chlorinated vinyl chloride-based resin foamed molded product in accordance with one or more embodiments of the present invention obtained from the chlorinated vinyl chloride-based resin expanded particles each may have a closed cell ratio of not less than 70%, not less than 80%, or not less than 90%. In a case where the expanded particles and the foamed molded product each have a closed cell ratio in the range as described above, for example, the following effects are brought about: the effect that second-step expansion of the expanded particles easily occurs at the molding of expanded particles, the effect that the expanded particles have good moldability, and the effect that an obtained foamed molded product is excellent in surface property and other properties. Further, having the closed cell ratio in the range as described above tends to increase strength such as compressive strength of a foamed molded product.

(Applications of Foamed Molded Product)

A foamed molded product molded with use of expandable chlorinated vinyl chloride-based resin particles in accordance with one or more embodiments of the present invention has high expansion ratio and high closed cell ratio and has excellent flame retardancy. Therefore, the foamed molded product may be suitable for various applications such as a heat insulating material for a building, a ceiling material, a core material for a metal sandwich panel, a food container box, a cool box, a cushioning material, a box for agricultural or fishery products, a heat insulating material for a bathroom, and a heat insulating material for a hot-water tank.

One or more embodiments of the present invention are not limited to the above-described embodiments, but may be altered in various ways within the scope of the claims. One or more embodiments of the present invention also encompass, in its technical scope, any embodiments derived by combining technical means disclosed in differing embodiments.

One or more embodiments of the present invention may be configured as follows.

[1] Expandable chlorinated vinyl chloride-based resin particles having a porosity of not more than 5.5 (ml/100 g).

[2] The expandable chlorinated vinyl chloride-based resin particles described in [1], wherein a maximum expansion ratio (times)/volatile component content at expansion (% by weight) is not less than 2.2.

[3] The expandable chlorinated vinyl chloride-based resin particles described in any one of [1] to [2], including a chlorinated vinyl chloride-based resin having a chlorine content of not less than 60% by weight and not more than 75% by weight.

[4] The expandable chlorinated vinyl chloride-based resin particles described in any one of [1] to [3], including a physical blowing agent.

[5] The expandable chlorinated vinyl chloride-based resin particles described in any one of [1] to [4], including at least one saturated hydrocarbon having 4 to 6 carbon atoms.

[6] The expandable chlorinated vinyl chloride-based resin particles described in any one of [1] to [5], including ketone.

[7] The expandable chlorinated vinyl chloride-based resin particles described in any one of [1] to [6], including a chlorinated vinyl chloride-based resin having an average polymerization degree of not less than 300 and not more than 3000.

The expandable chlorinated vinyl chloride-based resin particles described in any one of [1] to [7], including at least one saturated hydrocarbon having 4 to 6 carbon atoms, wherein the at least one saturated hydrocarbon having 4 to 6 carbon atoms is pentane.

[9] The expandable chlorinated vinyl chloride-based resin particles described in any one of [1] to [8], including a blowing agent in an amount of 1% by weight to 40% by weight, with respect to 100% by weight of the expandable chlorinated vinyl chloride-based resin particles.

[10] The expandable chlorinated vinyl chloride-based resin particles described in any one of [1] to [9], including a copolymer having an aromatic vinyl monomer and an unsaturated nitrile as structural units and/or an acrylic-based resin.

[11] The expandable chlorinated vinyl chloride-based resin particles described in any one of [1] to [10], including chlorinated polyethylene.

[12] A method for producing expandable chlorinated vinyl chloride-based resin particles, the method including the step of: immediately after extruding a blowing agent-containing chlorinated vinyl chloride-based resin melt, which has been obtained by melting and kneading with use of an extruder, through a die having a plurality of holes into pressurized water, cutting the extruded blowing agent-containing chlorinated vinyl chloride-based resin melt into particles with use of a rotary cutter while cooling the extruded blowing agent-containing chlorinated vinyl chloride-based resin melt to solidify, wherein a resin temperature of the blowing agent-containing chlorinated vinyl chloride-based resin melt at a tip of the extruder is 130° C. to 250° C.

[13] A method for producing expandable chlorinated vinyl chloride-based resin particles, the method including the step of: immediately after extruding a blowing agent-containing chlorinated vinyl chloride-based resin melt, which has been obtained by melting and kneading with use of an extruder, through a die having a plurality of holes into pressurized water, cutting the extruded blowing agent-containing chlorinated vinyl chloride-based resin melt into particles with use of a rotary cutter while cooling the extruded blowing agent-containing chlorinated vinyl chloride-based resin melt to solidify, wherein a pressure at a tip of the extruder is 4 MPa to 20 MPa.

[14] Chlorinated vinyl chloride-based resin expanded particles obtained by pre-expanding the expandable chlorinated vinyl chloride-based resin particles described in any one of [1] to [11] or the expandable chlorinated vinyl chloride-based resin particles obtained by the method for producing expandable chlorinated vinyl chloride-based resin particles described in any one of [12] to [13].

[15] The chlorinated vinyl chloride-based resin expanded particles described in [14], wherein the chlorinated vinyl chloride-based resin expanded particles have a closed cell ratio of not less than 70%.

[16] A chlorinated vinyl chloride-based resin foamed molded product obtained by subjecting the chlorinated vinyl chloride-based resin expanded particles described in any one of [14] to [15] to foam molding.

[17] The chlorinated vinyl chloride-based resin foamed molded product described in [16], wherein the chlorinated vinyl chloride-based resin foamed molded product has a closed cell ratio of not less than 70%.

[18] A method for producing a chlorinated vinyl chloride-based resin foamed molded product, the method including the step of: molding the chlorinated vinyl chloride-based resin expanded particles described in any one of [14] to [15].

EXAMPLES

The following description will discuss one or more embodiments of the present invention in detail on the basis of Examples and Comparative Examples. One or more embodiments of the present invention are, however, not limited by the Examples and the Comparative Examples.

Note that the following measurement methods and evaluation methods were employed in the Examples and the Comparative Examples below.

<Porosity Evaluation of Expandable Chlorinated Vinyl Chloride-Based Resin Particles>

Porosity evaluation of the obtained expandable chlorinated vinyl chloride-based resin particles as a sample was carried out under the following conditions with use of AutoPore IV9500 (produced by Micromeritics, U.S.A.).

As the sample, 0.35 g of the expandable chlorinated vinyl chloride-based resin particles was weighed and added to a cell described below. The cell used was a cell for powder, and the cell used had a sample chamber volume of 5 cc, a maximum measured volume of 0.366 cc, a total stem volume of 0.392 cc, a maximum mercury head pressure of 4.45 psia, a cell constant of 11.117 μL/pF, an external dimension I (measured stem length) of 215 mm, H (total stem length) of 230 mm, and D (stem diameter) of 1.473 mm. Further, None was selected as Correction method, and measurement was performed without correction. The cell to which the sample was added was depressurized to 50 μmHg, and further depressurization was carried out for 5 minutes (after the state of 50 μmHg was maintained for 5 minutes, mercury was introduced, and evaluation was carried out). After the depressurized cell was filled with mercury at a pressure of 1.52 psia, a pressure of 2 psia to 33000 psia was applied to the mercury, and porosity evaluation was carried out. In the description of the specification, the amount of mercury that has penetrated into the sample under the pressure in the range of 20 psia to 33000 psia is referred to as porosity. The amount of mercury that has penetrated into pores of the expandable chlorinated vinyl chloride-based resin particles that are the sample can be determined from the displacement of a mercury column in a sample container. The displacement is calculated from a change in capacitance between the mercury and the electrodes on the tube wall of the sample container. The AutoPore IV9500 uses a capacitance type detector to calculate the displacement of the mercury column from the measured capacitance, and calculates the amount of mercury (porosity) that has penetrated into the sample.

A pressure profile at the time of measurement is as described below. The pressure was increased to each of pressures (injection pressures) described below, and the measurement was carried out with an equilibrium time of 10 seconds at each pressure.

The pressures were: 2 psia, 3 psia, 4 psia, 5.5 psia, 7 psia, 8.5 psia, 10.5 psia, 13 psia, 16 psia, 20 psia, 23 psia, 25 psia, 30 psia, 40 psia, 50 psia, 60 psia, 75 psia, 90 psia, 115 psia, 140 psia, 175 psia, 220 psia, 270 psia, 330 psia, 420 psia, 520 psia, 640 psia, 700 psia, 800 psia, 990 psia, 1200 psia, 1300 psia, 1400 psia, 1500 psia, 1600 psia, 1700 psia, 1900 psia, 2050 psia, 2200 psia, 2350 psia, 2500 psia, 2650 psia, 2700 psia, 2850 psia, 3000 psia, 3250 psia, 3500 psia, 3750 psia, 4000 psia, 4250 psia, 4500 psia, 4740 psia, 5000 psia, 5300 psia, 5500 psia, 5750 psia, 6000 psia, 6250 psia, 6500 psia, 6750 psia, 7000 psia, 7500 psia, 8000 psia, 8500 psia, 9000 psia, 9300 psia, 9600 psia, 10050 psia, 10500 psia, 11000 psia, 11500 psia, 12000 psia, 12600 psia, 13100 psia, 13650 psia, 14000 psia, 14340 psia, 14600 psia, 15000 psia, 15450 psia, 15800 psia, 16200 psia, 16650 psia, 17000 psia, 17350 psia, 17700 psia, 18100 psia, 18450 psia, 18800 psia, 19200 psia, 19800 psia, 20300 psia, 20800 psia, 21200 psia, 21650 psia, 22050 psia, 22650 psia, 23200 psia, 23750 psia, 24100 psia, 24650 psia, 25050 psia, 25450 psia, 25900 psia, 26450 psia, 26950 psia, 27400 psia, 27800 psia, 28250 psia, 29000 psia, 29500 psia, 30000 psia, 30450 psia, 30900 psia, 31300 psia, 31800 psia, 32350 psia, and 33000 psia.

The pore radius at the time of measurement is calculated by $r = 2\delta \cos\theta/P$, where r is a pore radius, $\delta$ is a mercury surface tension, $\theta$ is a mercury contact angle, and P is an injection pressure. Given that the mercury contact angle of 130° and the surface tension was 485 dynes/cm, the pores existing in the sample were calculated. Both an injection contact angle and an exit contact angle were set to 130°, and a mercury density was set to 13.5335 g/ml.

<Measurement of the Amount of Blowing Agent (Volatile Component Content) Contained in Expandable Chlorinated Vinyl Chloride-Based Resin Particles>

A weight $W_1$ (g) of the expandable chlorinated vinyl chloride-based resin particles was measured. Next, the expandable chlorinated vinyl chloride-based resin particles were heated in an oven at 150° C. for 30 minutes, and the heated expandable chlorinated vinyl chloride-based resin particles were then cooled in a desiccator at room temperature for 30 minutes. Then, a weight $W_2$ (g) of the cooled expandable chlorinated vinyl chloride-based resin particles was measured again. A weight difference $(W_1 - W_2)$ of the expandable chlorinated vinyl chloride-based resin particles before and after heating was considered to be a blowing agent content of the expandable chlorinated vinyl chloride-based resin particles. In the present specification, the blowing agent content may be referred to as a volatile component content. The above-mentioned volatile component content was calculated by the following formula:

$$\text{Volatile component content (\% by weight)} = (W_1 - W_2)/W_1 \times 100.$$

At the time of evaluation of expansion in a heated air atmosphere described later (that is, on the same date as the date when the expansion evaluation was carried out), a value (volatile component content) calculated based on the above formula from the measurements obtained under the above conditions is referred to as a volatile component content at the expansion (% by weight).

<Measurement of Particle Weight of Expandable Chlorinated Vinyl Chloride-Based Resin Particles>

With use of an electronic balance capable of measuring down to 0.01 mg, the weight of 100 randomly sampled expandable chlorinated vinyl chloride-based resin particles was measured, and the particle weight was calculated by the following formula:

$$\text{Particle weight (mg)} = [\text{Weight (mg) of 100 expandable chlorinated vinyl chloride-based resin particles}]/100.$$

<Measurement of True Density of Expandable Chlorinated Vinyl Chloride-Based Resin Particles>

Expandable chlorinated vinyl chloride-based resin particles having a weight W (kg) were submerged in ethanol in a graduated cylinder, and a volume V (m³) was determined from a difference in liquid level in the graduated cylinder (submersion method). Calculation was carried out by the following formula:

$$\text{True density of expandable chlorinated vinyl chloride-based resin particles (kg/m}^3) = (W/V).$$

<Measurement of True Density of Chlorinated Vinyl Chloride-Based Resin Pellets (Base Resin)>

A chlorinated vinyl chloride-based resin and auxiliary materials such as a processing aid, a stabilizer, and a lubricant were blended to obtain a uniform compound. Then, the compound was melted and kneaded with use of an extruder to obtain chlorinated vinyl chloride-based resin pellets. Chlorinated vinyl chloride-based resin pellets having a weight W (kg) were submerged in ethanol in a graduated cylinder, and a volume V (m³) was determined from a difference in liquid level in the graduated cylinder (submersion method). Calculation was carried out by the following formula:

$$\text{True density of chlorinated vinyl chloride-based resin pellets (kg/m}^3) = (W/V).$$

The true density of the chlorinated vinyl chloride-based resin pellets measured based on the above-mentioned method was 1430 kg/m³, and this value was considered to be the density of the base resin used in one or more embodiments of the present invention.

<Measurement of Expansion Ratio of Chlorinated Vinyl Chloride-Based Resin Expanded Particles>

Chlorinated vinyl chloride-based resin expanded particles having a weight W (kg) were submerged in ethanol in a graduated cylinder, and a volume V (m³) was determined from a difference in liquid level in the graduated cylinder (submersion method). Calculation was carried out by the following formula. From the above-mentioned <Measurement of true density of chlorinated vinyl chloride-based resin pellets (base resin)> section, the base resin density of 1430 kg/m³ was used.

$$\text{Expansion ratio (times) of chlorinated vinyl chloride-based resin expanded particles} = 1430/(W/V).$$

<Evaluation of Expansion in Heated Air Atmosphere>

Expandable chlorinated vinyl chloride-based resin particles were introduced in an oven (produced by AS ONE Corporation, forced convection constant temperature dryer SOFW-600) heated to 130° C. The expandable resin particles were expanded for different heating times in a heated air atmosphere at a temperature of 130° C., so that expanded particles for each heating time were obtained. The heating time was changed in 30-second increments such as 30 seconds, 60 seconds, 90 seconds, etc. after the expandable resin particles were introduced into the oven, and heating was carried out until shrinkage of the expanded particles (decrease in expansion ratio of the expanded particles) due to excessive heating was observed. The expansion ratios of the expanded particles obtained by heating for the different heating times were measured based on the above-mentioned <Measurement of expansion ratio of chlorinated vinyl chloride-based resin expanded particles>. The highest expansion ratio among the obtained expansion ratios was considered to be a maximum expansion ratio of the chlorinated vinyl chloride-based resin expanded particles. Further, as described in the above-mentioned <Measurement of the amount of blowing agent (volatile component content) contained in expandable chlorinated vinyl chloride-based resin particles> section, the volatile component content was calculated on the same date as the date when the evaluation of expansion in a heated air atmosphere was carried out, and was considered to be a volatile component content (% by weight) at the expansion.

<Evaluation of Expansion in Steam Atmosphere>

Expandable chlorinated vinyl chloride-based resin particles were introduced into a pre-expanding machine (produced by Obiraki Industry Co., Ltd.). Steam at 0.16 MPa was introduced into the pre-expanding machine, and the expandable resin particles were expanded under the condition in which the temperature inside the pre-expanding machine was 90° C. to 110° C., so that expanded particles (chlorinated vinyl chloride-based resin expanded particles) were obtained. The expandable chlorinated vinyl chloride-based resin particles were expanded under the condition in which the amount of expandable chlorinated vinyl chloride-based resin particles introduced into the pre-expanding machine was 1000 g, so that expanded particles were obtained. The expansion ratio of the obtained expanded particles was measured based on the above-mentioned <Measurement of expansion ratio of chlorinated vinyl chloride-based resin expanded particles>.

<Measurement of Average Cell Diameter of Chlorinated Vinyl Chloride-Based Resin Expanded Particles>

A chlorinated vinyl chloride-based resin expanded particle was cut with use of a razor in such a manner that the razor passed through the center of the chlorinated vinyl chloride-based resin expanded particle, and a cut surface was observed with use of an optical microscope. The number of cells existing in an area of a 2000 µm×2000 µm square of the cut surface was counted, and a value calculated based on the following formula (area average diameter) was considered to be an average cell diameter. Five respective average cell diameters of 5 chlorinated vinyl chloride-based resin expanded particles of each sample were measured, and an average of the five average cell diameters was considered to be a standard average cell diameter.

$$\text{Average cell diameter } (\mu m) = 2 \times [2000 \ \mu m \times 2000 \ \mu m / (\text{number of cells} \times \pi)]^{1/2}.$$

<Measurement of Closed Cell Ratio of Chlorinated Vinyl Chloride-Based Resin Expanded Particles>

An appropriate amount of expanded particles was measured in volume Vc ($cm^3$) with use of an air pycnometer (air comparison pycnometer model 1000 produced by Tokyo-Science Co., Ltd.) in conformity to the method described in ASTM D2856. Next, the same expanded particles after the measurement were submerged in ethanol in a graduated cylinder, and a volume Va ($cm^3$) was determined from a difference in liquid level in the graduated cylinder (submersion method). A closed cell ratio (%) was calculated in accordance with the following formula:

$$\text{Closed cell ratio } (\%) = (Vc/Va) \times 100.$$

<Moldability Evaluation of Chlorinated Vinyl Chloride-Based Resin Expanded Particles>

The expanded particles obtained by the method described in the above-described <Evaluation of expansion in steam atmosphere> were filled into a mold for in-mold molding (length 400 mm×width 400 mm×thickness 25 mm) attached to a molding machine for styrene foam. Next, steam at 0.12 MPa was introduced into the mold for 30 seconds and thereby in-mold foaming of the expanded particles was caused, and then water was sprayed onto the mold for 20 seconds so as to cool the mold. A chlorinated vinyl chloride-based resin foamed molded product was held inside the mold until a pressure at which the chlorinated vinyl chloride-based resin foamed molded product in the mold pushed the mold reached 0.05 MPa (gage pressure). Then, the chlorinated vinyl chloride-based resin foamed molded product was released from the mold. In this way, a chlorinated vinyl chloride-based resin foamed molded product having a rectangular parallelepiped shape was obtained.

<Measurement of Expansion Ratio of Chlorinated Vinyl Chloride-Based Resin Foamed Molded Product>

A longitudinal size X (mm), a lateral size Y (mm), and a thickness size Z (mm) of the foamed molded product were measured with use of a vernier caliper, and a weight W (g) of the foamed molded product was measured with use of an electronic balance. An expansion ratio of the foamed molded product was determined based on the following formula. From the above-mentioned <Measurement of true density of chlorinated vinyl chloride-based resin pellets (base resin)>, the base resin density of 1430 $kg/m^3$ was used.

$$\text{Expansion Ratio of foamed molded product (times)} = 1430/(W/(X \times Y \times Z) \times 10^6)$$

<Surface Property Evaluation of Chlorinated Vinyl Chloride-Based Resin Foamed Molded Product>

The surface property of the obtained foamed molded product was visually observed in a field of view of 300 mm×300 mm and was evaluated based on the following criteria:

Good: There are less than 60 gaps of not less than 3 mm between the expanded particles on the surface of the molded product.

Bad: There are 60 or more gaps of not less than 3 mm between the expanded particles on the surface of the molded product.

Raw materials used in the Examples and the Comparative examples are as follows.

(Vinyl Chloride-Based Resin)

(A-1) Chlorinated vinyl chloride resin [produced by Kaneka Corporation, H716S; average polymerization degree: 600; chlorine content: 67.6% by weight]

(Processing Aid)

(B-1) Acrylic-based resin [produced by Kaneka Corporation, KANE ACE PA-40]

(B-2) Styrene-acrylonitrile copolymer (produced by Galata, Blendex 869; weight-average molecular weight: 2.86 million; ratio of acrylonitrile-derived component in the copolymer: 20% by weight)

(Blowing Agent)

(C-1) Normal pentane [produced by FUJIFILM Wako Pure Chemical Corporation]

(C-2) Acetone [produced by FUJIFILM Wako Pure Chemical Corporation]

Example 1

[Preparation of Expandable Chlorinated Vinyl Chloride-Based Resin Particles]

A compound was obtained by adding 10 parts by weight of acrylic-based resin (B-1), and, further, 5 parts by weight of butyl tin mercapto-based stabilizer, 3 parts by weight of lubricant (ester wax, polyethylene wax), and 5 parts by weight of chlorinated polyethylene having a chlorine content of 35% by weight with respect to 100 parts by weight of chlorinated vinyl chloride resin (A-1). This compound was blended to obtain a uniform compound. Then, the compound was melted and kneaded with use of an intermeshing co-rotating twin-screw extruder to obtain pellets in the above-described compound ratio. The obtained pellets are pellets of a chlorinated vinyl chloride-based resin, and may be referred to as a base resin. The obtained pellets were fed to a twin-screw extruder at a feed amount of 40 kg/hour, and the pellets were melted and kneaded. The twin-screw extruder used is an intermeshing co-rotating twin-screw extruder with a shaft diameter of 40 mm.

In a halfway position of the intermeshing co-rotating twin-screw extruder with a shaft diameter of 40 mm, 8.8 parts by weight of normal pentane (C-1) and 3.8 parts by weight of acetone (C-2) were injected with respect to 100 parts by weight of the pellets. After that, the melted and kneaded product (resin melt) was cooled to a resin temperature of 165° C. via a continuous pipe attached to the tip of the twin-screw extruder, a single-screw extruder, a gear pump, and a diverter valve. Then, through a die with 30 small holes each having a diameter of 1.0 mm and a land length of 3.5 mm attached downstream of the diverter valve and set to 250° C., the resin melt was extruded at a throughput rate of 45 kg/hour into pressurized circulating water at a temperature of 85° C. and 1.3 MPa. At this time, the pressure at the tip of the extruder was 10 MPa, and the resin temperature of the melt (that is, the resin temperature of the resin melt at the tip of the extruder) was 167° C. Note that, in Examples 1 to 3, the tip of the extruder refers to the tip of a single-screw extruder. The resin melt thus extruded was cut into particles with use of a rotary cutter which is in contact with the die, and was transferred to a centrifugal dehydrator. In this way, expandable chlorinated vinyl chloride-based resin particles having a particle weight of 5.5 mg were obtained.

[Porosity Evaluation of Expandable Vinyl Chloride-Based Resin Particles]

The expandable chlorinated vinyl chloride-based resin particles thus obtained were preserved at 10° C. for 7 days. Then, the porosity was evaluated by the method described in the above-mentioned <Porosity evaluation of expandable chlorinated vinyl chloride-based resin particles> section. The result was 3.16 (ml/100 g). The result is shown in Table 1.

[Evaluation of Expansion of Expandable Chlorinated Vinyl Chloride-Based Resin Particles in Heated Air Atmosphere]

The expandable chlorinated vinyl chloride-based resin particles thus obtained were preserved at 10° C. for 7 days. Then, the volatile component content at the expansion and the evaluation of the expansion were performed by the methods described in the above-mentioned <Measurement of the amount of blowing agent (volatile component content) contained in expandable chlorinated vinyl chloride-based resin particles> section and <Evaluation of expansion in heated air atmosphere> section. The result was that the volatile component content at the expansion was 9.4% by weight, and the maximum expansion ratio of the expanded particles was 26.9 times. Note that the maximum expansion ratio/volatile component content at the expansion was 2.9. The results are shown in Table 1.

Example 2

Expandable chlorinated vinyl chloride-based resin particles having a particle weight of 5.5 mg were obtained in the same manner as in Example 1 except that, in Example 1, 10 parts by weight of acrylic-based resin (B-1) was changed to 13 parts by weight of styrene-acrylonitrile copolymer (B-2). At this time, the pressure at the tip of the extruder was 9 MPa, and the resin temperature of the melt was 167° C.

On the expandable chlorinated vinyl chloride-based resin particles thus obtained, porosity evaluation was carried out in the same manner as in Example 1.

The true density of the expandable chlorinated vinyl chloride-based resin particles thus obtained was measured by the method described in the above-mentioned <Measurement of true density of expandable chlorinated vinyl chloride-based resin particles> section. The result was 1299 kg/m³.

On the expandable chlorinated vinyl chloride-based resin particles thus obtained, evaluation of expansion in a heated air atmosphere was carried out in the same manner as in Example 1.

The evaluation results are shown in Table 1.

[Preparation of Chlorinated Vinyl Chloride-Based Resin Expanded Particles]

The expandable chlorinated vinyl chloride-based resin particles thus obtained were preserved at 10° C. for 7 days. Then, expanded particles were obtained by the method described in the above-mentioned <Evaluation of expansion in steam atmosphere> section. The expanded particles thus obtained were 19.3 times.

The cell diameter and closed cell ratio of the expanded particles thus obtained were measured by the method described in the above-mentioned <Measurement of average cell diameter of chlorinated vinyl chloride-based resin expanded particles> section and <Measurement of closed cell ratio of chlorinated vinyl chloride-based resin expanded particles> section. The result was that the average cell diameter was 580 μm, and the closed cell ratio was 96%.

[Preparation of Chlorinated Vinyl Chloride-Based Resin Foamed Molded Product]

The expanded particles thus obtained were preserved in an atmosphere of 30° C. for 24 hours. Then, a foamed molded product was obtained by the method described in the above-mentioned <Moldability evaluation of chlorinated vinyl chloride-based resin expanded particles> section. The expansion ratio of the foamed molded product thus obtained was 31 times.

The surface property of the foamed molded product thus obtained was evaluated by the method described in the above-mentioned <Surface property evaluation of chlorinated vinyl chloride-based resin foamed molded product> section. The result was that the surface property of the molded product was "Good".

Example 3

A resin melt cooled to the resin temperature of 165° C. was prepared in the same manner as in Example 1 except that, in Example 1, 10 parts by weight of acrylic-based resin (B-1) was changed to 13 parts by weight of styrene-acrylonitrile copolymer (B-2), the amount of acetone (C-2) was changed from 3.8 parts by weight to 2.2 parts by weight, and the temperature of the die was changed from 250° C. to 245° C. The resin melt was extruded at a throughput rate of 44.3 kg/hour into pressurized circulating water at a temperature of 85° C. and 1.3 MPa. In this way, expandable chlorinated vinyl chloride-based resin particles having a particle weight of 4.5 mg were obtained. At this time, the pressure at the tip of the extruder was 12 MPa, and the resin temperature of the melt was 166° C.

On the expandable chlorinated vinyl chloride-based resin particles thus obtained, porosity evaluation and evaluation of expansion in a heated air atmosphere were carried out in the same manner as in Example 1.

The evaluation results are shown in Table 1.

Comparative Example 1

[Preparation of Chlorinated Vinyl Chloride-Based Resin Particles]

A compound was obtained by adding 10 parts by weight of acrylic-based resin (B-1), and, further, 5 parts by weight of butyl tin mercapto-based stabilizer, 3 parts by weight of lubricant (ester wax, polyethylene wax), and 5 parts by weight of chlorinated polyethylene having a chlorine content of 35% by weight with respect to 100 parts by weight of chlorinated vinyl chloride resin (A-1). This compound was blended to obtain a uniform compound. Then, the compound was melted and kneaded with use of an intermeshing co-rotating twin-screw extruder to obtain pellets in the above-described compound ratio.

The pellets thus obtained were melted and kneaded with use of a twin-screw extruder. After that, the melted and kneaded product was extruded in the form of strands through a die with 13 small holes each having a diameter of 1.7 mm attached to a tip of the extruder at a throughput rate of 8 kg/hour. The extruded melted and kneaded product was allowed to cool to solidify in a water tank and then was cut with use of a strand cutter. In this way, chlorinated vinyl chloride-based resin particles having a particle weight of 6 mg were obtained.

[Preparation of Expandable Chlorinated Vinyl Chloride-Based Resin Particles]

100 parts by weight of the obtained chlorinated vinyl chloride-based resin particles and 170 parts by weight of normal pentane (C-1) were placed in a pressure-resistant container having a capacity of 100 cc, and the pressure-resistant container was sealed. Next, the pressure-resistant container was heated in an oil bath at 120° C. for 24 hours, and the pressure-resistant container was then cooled. With such an operation, expandable chlorinated vinyl chloride-based resin particles were obtained.

[Porosity Evaluation of Expandable Chlorinated Vinyl Chloride-Based Resin Particles]

The expandable chlorinated vinyl chloride-based resin particles thus obtained were preserved at 10° C. for 7 days. Then, the porosity was evaluated by the method described in the above-mentioned <Porosity evaluation of expandable chlorinated vinyl chloride-based resin particles> section. The result was 6.36 (ml/100 g). The result is shown in Table 2.

[Evaluation of Expansion of Expandable Chlorinated Vinyl Chloride-Based Resin Particles in Heated Air Atmosphere]

The expandable chlorinated vinyl chloride-based resin particles thus obtained were preserved at 10° C. for 7 days. Then, the volatile component content at the expansion and the evaluation of the expansion were performed by the methods described in the above-mentioned <Measurement of the amount of blowing agent (volatile component content) contained in expandable chlorinated vinyl chloride-based resin particles> section and <Evaluation of expansion in heated air atmosphere> section. The result was that the volatile component content at the expansion was 12.2% by weight, and the maximum expansion ratio of the expanded particles was 22.4 times. Note that the maximum expansion ratio/volatile component content at the expansion was 1.8. The results are shown in Table 2.

Comparative Example 2

Expandable chlorinated vinyl chloride-based resin particles were obtained in the same manner as in Comparative Example 1.

Porosity evaluation was carried out in the same manner as in Comparative Example 1 except that the expandable chlorinated vinyl chloride-based resin particles thus obtained were allowed to stand in an environment at a temperature of 23° C. and at a humidity of 50% for 14 days.

Evaluation of expansion in a heated air atmosphere was carried out in the same manner as in Comparative Example 1 except that the expandable chlorinated vinyl chloride-based resin particles thus obtained were preserved in an environment at a temperature of 23° C. and at a humidity of 50% for 14 days.

The evaluation results are shown in Table 2.

Comparative Example 3

Expandable chlorinated vinyl chloride-based resin particles having a particle weight of 5.5 mg were obtained in the same manner as in Comparative Example 1 except that, in Comparative Example 1, 10 parts by weight of acrylic-based resin (B-1) was changed to 13 parts by weight of styrene-acrylonitrile copolymer (B-2).

On the expandable chlorinated vinyl chloride-based resin particles thus obtained, porosity evaluation and evaluation of expansion in a heated air atmosphere were carried out in the same manner as in Comparative Example 1.

The evaluation results are shown in Table 2.

Comparative Example 4

Expandable chlorinated vinyl chloride-based resin particles were obtained in the same manner as in Comparative Example 3.

Porosity evaluation was carried out in the same manner as in Comparative Example 1 except that the expandable chlorinated vinyl chloride-based resin particles thus obtained were allowed to stand in an environment at a temperature of 23° C. and at a humidity of 50% for 14 days.

Evaluation of expansion in a heated air atmosphere was carried out in the same manner as in Comparative Example 1 except that the expandable chlorinated vinyl chloride-based resin particles thus obtained were preserved in an environment at a temperature of 23° C. and at a humidity of 50% for 14 days.

The evaluation results are shown in Table 2.

Comparative Example 5

[Preparation of Chlorinated Vinyl Chloride-Based Resin Particles]

Chlorinated vinyl chloride-based resin particles having a particle weight of 6 mg were obtained in the same manner as in Comparative Example 1.

[Preparation of Expandable Chlorinated Vinyl Chloride-Based Resin Particles]

100 parts by weight of the obtained chlorinated vinyl chloride-based resin particles, 153 parts by weight of normal pentane (C-1), and 17 parts by weight of acetone (C-2) were placed in a pressure-resistant container having a capacity of 100 cc, and the pressure-resistant container was sealed. Next, the pressure-resistant container was heated in an oil bath at 100° C. for 12 hours, and the pressure-resistant container was then cooled. With such an operation, expandable chlorinated vinyl chloride-based resin particles were obtained.

Porosity evaluation was carried out in the same manner as in Comparative Example 1 except that the expandable chlorinated vinyl chloride-based resin particles thus obtained were preserved at 10° C. for 14 days.

Evaluation of expansion in a heated air atmosphere was carried out in the same manner as in Comparative Example 1 except that the expandable chlorinated vinyl chloride-based resin particles thus obtained were preserved at 10° C. for 14 days.

The evaluation results are shown in Table 2.

Comparative Example 6

Expandable chlorinated vinyl chloride-based resin particles were obtained in the same manner as in Comparative Example 5.

Porosity evaluation was carried out in the same manner as in Comparative Example 1 except that the expandable chlorinated vinyl chloride-based resin particles thus obtained were allowed to stand in an environment at a temperature of 23° C. and at a humidity of 50% for 14 days.

Evaluation of expansion in a heated air atmosphere was carried out in the same manner as in Comparative Example 1 except that the expandable chlorinated vinyl chloride-based resin particles thus obtained were preserved in an environment at a temperature of 23° C. and at a humidity of 50% for 14 days.

The evaluation results are shown in Table 2.

Comparative Example 7

Expandable chlorinated vinyl chloride-based resin particles having a particle weight of 5.5 mg were obtained in the same manner as in Comparative Example 5 except that, in Comparative Example 5, 10 parts by weight of acrylic-based resin (B-1) was changed to 13 parts by weight of styrene-acrylonitrile copolymer (B-2).

Porosity evaluation was carried out in the same manner as in Comparative Example 1 except that the expandable chlorinated vinyl chloride-based resin particles thus obtained were preserved at 10° C. for 14 days.

Evaluation of expansion in a heated air atmosphere was carried out in the same manner as in Comparative Example 1 except that the expandable chlorinated vinyl chloride-based resin particles thus obtained were preserved at 10° C. for 14 days.

The evaluation results are shown in Table 2.

In addition, expandable chlorinated vinyl chloride-based resin particles for pre-expansion and moldability evaluation were obtained in the same manner as above except that an autoclave having a capacity of 6 L and equipped with a stirring device was used.

The true density of the expandable chlorinated vinyl chloride-based resin particles thus obtained was measured by the method described in the above-mentioned <Measurement of true density of expandable chlorinated vinyl chloride-based resin particles> section. The result was 1232 kg/m³.

[Preparation of Chlorinated Vinyl Chloride-Based Resin Expanded Particles]

The expandable chlorinated vinyl chloride-based resin particles thus obtained were preserved at 10° C. for 14 days. Then, expanded particles were obtained by the method described in the above-mentioned <Evaluation of expansion in steam atmosphere> section. The expanded particles thus obtained were 20.4 times.

Comparative Example 8

Expandable chlorinated vinyl chloride-based resin particles were obtained in the same manner as in Comparative Example 7.

Porosity evaluation was carried out in the same manner as in Comparative Example 1 except that the expandable chlorinated vinyl chloride-based resin particles thus obtained were allowed to stand in an environment at a temperature of 23° C. and at a humidity of 50% for 14 days.

Evaluation of expansion in a heated air atmosphere was carried out in the same manner as in Comparative Example 1 except that the expandable chlorinated vinyl chloride-based resin particles thus obtained were preserved in an environment at a temperature of 23° C. and at a humidity of 50% for 14 days.

The evaluation results are shown in Table 2.

TABLE 1

| | | Examples | | |
| --- | --- | --- | --- | --- |
| | | 1 | 2 | 3 |
| Porosity | ml/100 g | 3.16 | 3.38 | 4.54 |
| Volatile component content at expansion | % by weight | 9.4 | 9.7 | 8.7 |
| Maximum expansion ratio | times | 26.9 | 31.0 | 27.2 |
| Maximum expansion ratio/volatile component content at expansion | times/% by weight | 2.9 | 3.2 | 3.1 |

TABLE 2

| | | Comparative Examples | | | | | | | |
| --- | --- | --- | --- | --- | --- | --- | --- | --- | --- |
| | | 1 | 2 | 3 | 4 | 5 | 6 | 7 | 8 |
| Porosity | ml/100 g | 6.36 | 8.47 | 6.58 | 8.66 | 9.48 | 6.21 | 11.23 | 6.19 |
| Volatile component content at expansion | % by weight | 12.2 | 8.9 | 11.4 | 9.1 | 11.7 | 9.5 | 12.7 | 9.5 |
| Maximum expansion ratio | times | 22.4 | 7.9 | 24.2 | 16.8 | 23.2 | 13.6 | 21.3 | 12.0 |
| Maximum expansion ratio/volatile component content at expansion | times/% by weight | 1.8 | 0.9 | 2.1 | 1.8 | 2.0 | 1.4 | 1.7 | 1.3 |

The average cell diameter and closed cell ratio of the expanded particles thus obtained were measured by the method described in the above-mentioned <Measurement of average cell diameter of chlorinated vinyl chloride-based resin expanded particles> section and <Measurement of closed cell ratio of chlorinated vinyl chloride-based resin expanded particles> section. The result was that the average cell diameter was 540 μm, and the closed cell ratio was 99%.

[Preparation of Chlorinated Vinyl Chloride-Based Resin Foamed Molded Product]

The expanded particles thus obtained were preserved in an atmosphere of 30° C. for 24 hours. Then, a foamed molded product was obtained by the method described in the above-mentioned <Moldability evaluation of chlorinated vinyl chloride-based resin expanded particles> section. The expansion ratio of the foamed molded product thus obtained was 32 times.

The surface property of the foamed molded product thus obtained was evaluated by the method described in the above-mentioned <Surface property evaluation of chlorinated vinyl chloride-based resin foamed molded product> section. The result was that the surface property of the molded product was "Bad".

A supplementary explanation of the above-mentioned results is provided. In Example 2, the volatile component content (the amount of blowing agent) was 9.7%, the expanded particles had an expansion ratio of 19.3 times, and the molded product had an expansion ratio of 31 times, whereas, in Comparative Example 7, the volatile component content (the amount of blowing agent) was 12.7%, the expanded particles had an expansion ratio of 20.4 times, and the molded product had an expansion ratio of 32 times. The volatile component content (the amount of blowing agent) at the expansion in Comparative Example 7 is higher than that in Example 2. When the volatile component content is about 9.7% (Comparative Example 8) as in Example 2, the expanded particles have an expansion ratio of 12 times. In this case, it is not possible to obtain a molded product having an expansion ratio of 30 times as obtained in Example 2. That is, it can be seen that when the porosity is not more than 5.5 (ml/100 g), the blowing agent is less likely to be dissipated, and Examples have high expansion ratio and excellent surface appearance as compared with Comparative Examples.

According to one or more embodiments of the present invention, it is possible to provide expandable chlorinated vinyl chloride-based resin particles from which a chlorinated vinyl chloride-based resin foamed molded product achieving both high expansion ratio and excellent surface appearance can be obtained. Further, expandable resin particles, expanded particles, and a foamed molded product in accordance with one or more embodiments of the present invention are excellent in flame retardancy. Therefore, one or more embodiments of the present invention may be suitable for various applications such as a heat insulating material for a building, a ceiling material, a core material for a metal sandwich panel, a food container box, a cool box, a cushioning material, a box for agricultural or fishery products, a heat insulating material for a bathroom, and a heat insulating material for a hot-water tank.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. Expandable chlorinated vinyl chloride-based resin particles having a porosity of not more than 5.5 ml/100 g.

2. The expandable chlorinated vinyl chloride-based resin particles according to claim 1, wherein a maximum expansion ratio times/volatile component content % by weight at expansion is not less than 2.2.

3. The expandable chlorinated vinyl chloride-based resin particles according to claim 1, comprising a chlorinated vinyl chloride-based resin having a chlorine content of not less than 60% by weight and not more than 75% by weight.

4. The expandable chlorinated vinyl chloride-based resin particles according to claim 1, comprising a physical blowing agent.

5. The expandable chlorinated vinyl chloride-based resin particles according to claim 1, comprising at least one saturated hydrocarbon having 4 to 6 carbon atoms.

6. The expandable chlorinated vinyl chloride-based resin particles according to claim 1, comprising ketone.

7. The expandable chlorinated vinyl chloride-based resin particles according to claim 1, comprising a chlorinated vinyl chloride-based resin having an average polymerization degree of not less than 300 and not more than 3000.

8. The expandable chlorinated vinyl chloride-based resin particles according to claim 1, comprising at least one saturated hydrocarbon having 4 to 6 carbon atoms, wherein the at least one saturated hydrocarbon having 4 to 6 carbon atoms is pentane.

9. The expandable chlorinated vinyl chloride-based resin particles according to claim 1, comprising a blowing agent in an amount of 1% by weight to 40% by weight, with respect to 100% by weight of the expandable chlorinated vinyl chloride-based resin particles.

10. The expandable chlorinated vinyl chloride-based resin particles according to claim 1, comprising a copolymer having an aromatic vinyl monomer and an unsaturated nitrile as structural units and/or an acrylic-based resin.

11. The expandable chlorinated vinyl chloride-based resin particles according to claim 1, comprising chlorinated polyethylene.

12. A method for producing expandable chlorinated vinyl chloride-based resin particles, the method comprising the step of:

extruding a blowing agent-containing chlorinated vinyl chloride-based resin melt, which has been obtained by melting and kneading with an extruder, through a die having a plurality of holes into pressurized water, immediately after the extruding, cutting the extruded blowing agent-containing chlorinated vinyl chloride-based resin melt into particles with a rotary cutter while cooling the extruded blowing agent-containing chlorinated vinyl chloride-based resin melt to solidify, wherein a resin temperature of the blowing agent-containing chlorinated vinyl chloride-based resin melt at a tip of the extruder is 130° C. to 250° C.

13. A method for producing expandable chlorinated vinyl chloride-based resin particles, the method comprising the step of:

extruding a blowing agent-containing chlorinated vinyl chloride-based resin melt, which has been obtained by melting and kneading with an extruder, through a die having a plurality of holes into pressurized water, immediately after the extruding, cutting the extruded blowing agent-containing chlorinated vinyl chloride-based resin melt into particles with a rotary cutter while cooling the extruded blowing agent-containing chlorinated vinyl chloride-based resin melt to solidify, wherein a pressure at a tip of the extruder is 4 MPa to 20 MPa.

14. Expandable chlorinated vinyl chloride-based resin particles obtained by the method for producing the expandable chlorinated vinyl chloride-based resin particles according to claim 12.

15. Expandable chlorinated vinyl chloride-based resin particles obtained by the method for producing the expandable chlorinated vinyl chloride-based resin particles according to claim 13.

* * * * *